United States Patent Office 3,440,036
Patented Apr. 22, 1969

3,440,036
RECOVERY OF COPPER FROM COPPER-BEARING SOLUTIONS
Robert W. Spinney, Staten Island, N.Y., assignor to Nassau Smelting and Refining Company, Incorporated, Staten Island, N.Y., a corporation of New York
Filed May 16, 1966, Ser. No. 550,282
Int. Cl. C22b 15/00
U.S. Cl. 75—117                    15 Claims

ABSTRACT OF THE DISCLOSURE

A process for extracting copper from copper-bearing ammonium persulfate etch solutions wherein the pH of the solution is adjusted to a value in the range of 5.5 to 7.5, and copper is extracted by liquid-liquid extraction utilizing an organic phase comprising a water-insoluble liquid hydrocarbon and an α-hydroxy oxime as the extraction agent.

---

Figure 1:
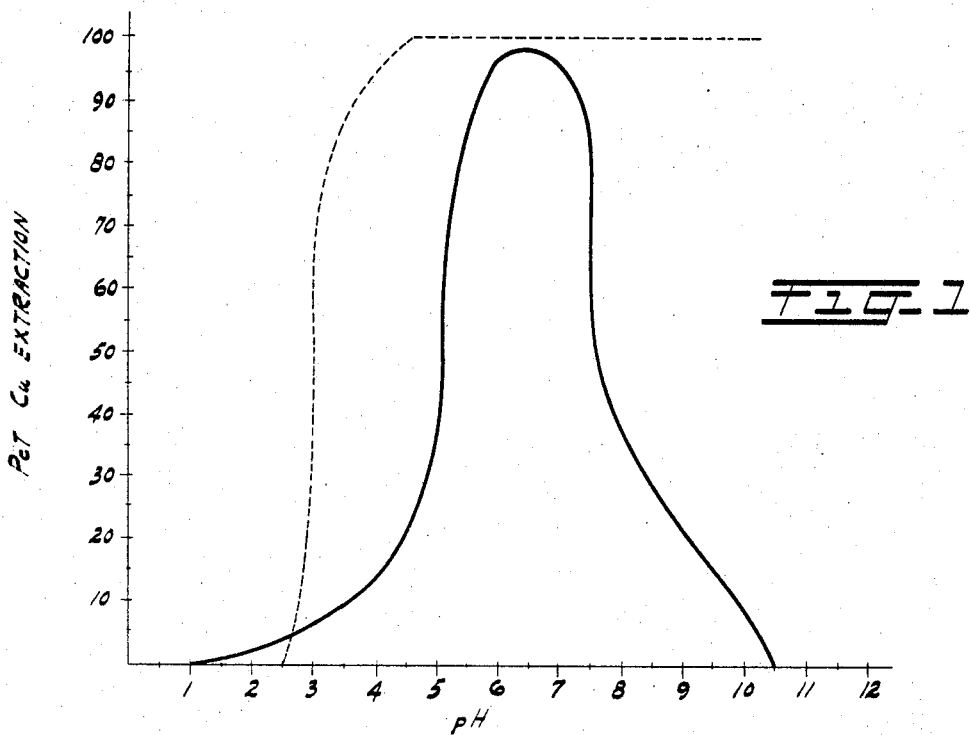

This invention relates generally to recovery of copper from copper-bearing solutions such as etch solutions employed in the production of printed circuits and, more particularly, the invention relates to the liquid-liquid ion exchange extraction of copper from ammonium sulfate-ammonium peroxydisulfate etch solutions with α-hydroxy oximes as the extraction agent.

Ammonium peroxydisulfate, commonly referred to as ammonium persulfate and having the formula $$(NH_4)_2S_2O_8$$

is an effective and fast etchant for copper. An aqueous solution of ammonium persulfate is usually employed for this purpose. During the course of etching, the persulfate is partially consumed forming ammonium sulfate and copper sulfate, all of course ionized in solution. When the etching rate of the solution drops to a low level, the solution must be discarded. The solution is highly toxic and presents a severe pollution problem due to the presence of copper salts. The pH of the solution is about 0.1 to 0.2, which means that even simple neutralization is an expensive procedure.

Two methods for the treatment of these solutions have been proposed. One is a two stage process involving electrodeposition of the copper directly on cathode sheets, followed by neutralization of the free acids with alkali metal hydroxides or carbonates. This method is both expensive and impractical, due to the difficulty of achieving complete copper removal in the first stage.

More recently, it has been proposed to add an excess of caustic soda to the solution, followed by heating to drive off the ammonia as a gas and to convert the copper to copper oxide, and filtering to remove the copper oxide. In adding caustic soda, the pH of the solution is preferably raised to about 12, which means that a very substantial amount of this reagent is required. The recovered copper oxide must of course be treated further if recovery of copper is to be realized, and the etch solution cannot be regenerated. This process is described in British Patent No. 905,615 granted to Lancy Laboratories of Zelienople, Penn.

It is thus a general object of the present invention to provide a new and improved process for recovering copper from ammonium persulfate solutions containing copper.

A further object of the invention is to provide an improved process for recovering copper from ammonium persulfate solutions which have been used to etch copper from copper-bearing articles, such as printed circuit boards.

Another object of the invention is to provide a new process for recovering copper from ammonium persulfate etch solutions wherein reagents are not consumed to any material extent.

Yet another object of the invention is to provide a new process for recovering copper from ammonium persulfate etch solutions wherein the etch solution may be regenerated after copper recovery.

Still another object of the present invention is to provide a new process for recovering copper from ammonium persulfate etch solutions wherein the copper values may be recovered as metallic copper or copper sulfate.

Various other objects and advantages of the invention will become clear from the following description of a specific embodiment thereof. The novel features of the invention will be particularly recited in the appended claims.

It has been previously demonstrated that α-hydroxy oximes are a class of extraction reagents which are especially selective to copper in either sulfuric acid leach solutions or ammoniacal liquors. Recovery of copper from such solutions is described in U.S. Patent No. 3,224,873 issued Dec. 21, 1965 to R. R. Swanson and assigned to General Mills, Inc.

The α-hydroxy oximes have the following general formula:

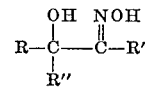

where R, R' and R" may be any of a variety of organic hydrocarbon radicals such as aliphatic and alkylaryl radicals. R" may also be hydrogen. Preferably, R and R' are unsaturated hydrocarbon or branched chain alkyl groups containing from about 6 to 20 carbon atoms. R and R' are also preferably the same and, when alkyl, are preferably attached to the carbons substituted with the —OH and =NOH groups through a secondary carbon atom. It is also preferred that R" be hydrogen, an unsaturated hydrocarbon, or a branched chain alkyl group containing from about 6 to 20 carbon atoms. The α-hydroxy oximes also preferably contain a total of from about 14 to about 40 carbon atoms.

Representative α-hydroxy oxime compounds which are suitable for this use are 19-hydroxyhexatriaconta-9,27-dien-18-oxime; 5-10-diethyl-8-hydroxytetradecan-7-oxime; and 5,8-diethyl-7-hydroxy-dodecane-6-oxime. The latter compound has the following structural formula:

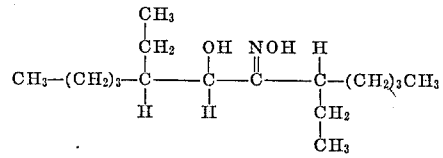

Representative of other mono- and polyunsaturated radicals are heptenyl, octenyl, decenyl, octadecenyl, octadecenyl and alkyl substituted radicals, such as ethyloctadecenyl. Representative of other mono- and polyalkyl substituted saturated radicals are ethylhexyl, diethylheptyl, butyldecyl, butylhexadecyl, ethylbutyldodecyl, butylcyclohexyl and the like.

In accordance with the teachings of the above-noted U.S. patent to Swanson, 0.1 to 0.4 molar solutions of the α-hydroxy oxime are prepared in a suitable, water insoluble hydrocarbon solvent, typically kerosene, in which it has a solubility of at least 2% by weight. A broad range of other insoluble liquid hydrocarbons can also be used as solvents for example gasoline, benzenes, toluenes naphthols, and higher alcohols. This organic phase is then mixed with the copper-bearing aqueous solution. Good extractions are achieved at pH above about 3.4 (85% plus), and good results from ammoniacal liquors are reported at pH 9.92. It is presumed from these results that extraction is satisfactory at pH in the range of about 3.4 to about 10. Results are reported for organic-aqueous phase ratios varying from 0.167 to 8.0, the lower ratios being utilized with the most concentrated organic phase (0.4 M), but it is obvious that satisfactory results require a ratio of at least 1 and preferably 2. After the copper is extracted into the organic phase, recovery is effected in the conventional manner by stripping, as with water or relatively dilute sulfuric acid, after which the copper can be electrodeposited on cathodes. The patentee also reports that the effect of ammonia concentration on extraction is negligible, and that various anions ($Cl^-$, $SO_4^=$, $NO_3^-$) have essentially no effect on extraction.

One might well expect that the $\alpha$-hydroxy oximes of the class described could be used to recover copper from saturated ammonium persulfate etch solutions by following the teachings of the patent. However, this is not the case, as illustrated by the following data.

A persulfate etch solution containing 4.10 g.p.l. of copper was adjusted to pH 4.8 and mixed with a 5% solution of an $\alpha$-hydroxy oxime in kerosene. The organic to aqueous phase ratio was 2. After appropriate mixing, the persulfate solution had a copper content of 3.50 g.p.l., indicating an extraction of only 15%. The above procedures were repeated at a pH of 9.9 and at this level extraction was 10%.

From the foregoing, it can be seen that at the pH values where the above-noted patentee achieved essentially 100% extraction of copper from acid and ammoniacal leach solutions, extraction from a persulfate etch solution was negligible. The reason for this is not known with precision, but a possible reaction mechanism is discussed hereinbelow.

Surprisingly, it has now been discovered that $\alpha$-hydroxy oximes can be employed to effectively extract copper from persulfate etch solutions, but only within the relatively narrow pH range of from about 5.5 to about 7.5.

For comparison purposes, attention is directed to the accompanying FIGURE 1, which is an extraction curve showing the effect of pH on extraction in accordance with the present invention, and in which the results achieved by using the method of the above-noted patent are indicated by a dotted line. Where the prior art indicates that extraction of 85% or better will be obtained at pH 3.4 or higher, it has now been discovered that, with the persulfate etch solutions, this degree of extraction efficiency is obtained only in the pH range of from about 5.5 to about 7.5. The best extractions are achieved at about pH 6.5.

While not wishing to be bound to any particular theory or explanation for the results obtained, the following observations can be made. At a pH below 4.2, the etch solution has a green color which is probably due to copper persulfate, the copper being in the form $(Cu(H_2O)_6)2+$. As the pH increases to 4.2, some extraction occurs, since, the energy of complex formation with the oxime is greater than that of the $(Cu(NH_x)2+$ ions. At a pH slightly above 4.2, the suppression of dissociation of ammonium hydroxide is less, and free $NH_4+$ ions are in sufficient concentration to begin the amine series formation as $(Cu(NH_3)(H_2O)_5)2+$. A color change occurs at pH 4.5–4.8 which may be explained by the formation of blue copper ammine ions, which would gradually shift the green color to greenish blue. At pH 5.7, the release of ammonium ions is sufficient to form the dark, indigo blue $(Cu(NH_3)_4)2+$ ion. High extraction from persulfate solutions appears to be dependent on the presence of this tertiary ammine ion.

The sharp decrease in extraction efficiency starting at a pH of about 7 indicates that, with increasing ammonia concentration, the ability of the $\alpha$-hydroxy oximes to separate the copper from the tertiary ammine decreases, as the concentration pressure of the free ammonia or ammonium ion tends to drive the complex ion dissociation in the direction of complex ion formation.

Figure 2:
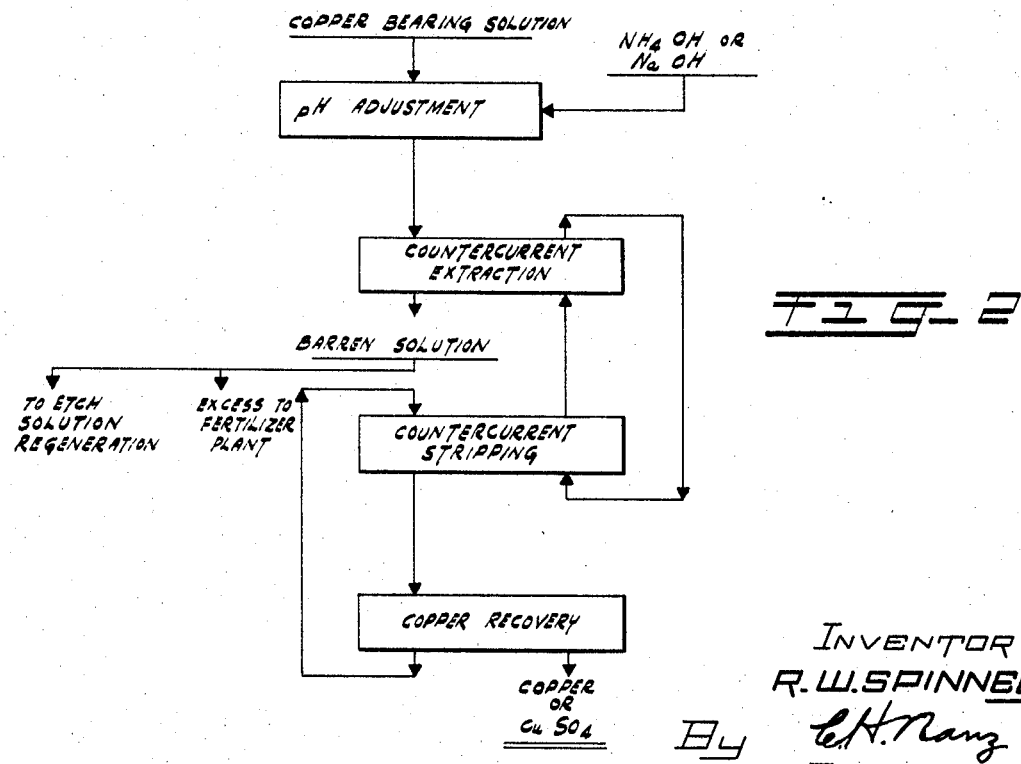

Operation of a process for recovery of copper from persulfate etch solutions is simple, and requires no special processing equipment. FIGURE 2 is a schematic flow sheet illustrating the operation of such a process.

The copper-bearing solution is passed directly from the ething operation to a suitable vessel where the pH is raised from the initial value of 0.1 to 0.2 up to 5.5–7.5 and preferably to about 6.5 by means of an alkali or alkaline earth hydroxide. It will be noted that containers, piping, fittings, etc. made of appropriate acid resistant materials must be used for the operations performed up to this point and in the stripping and recovery sections.

The solution next passes to a suitable liquid-liquid contacting device, for example, a four-stage solvent extraction unit with mixer and settler sections in each stage. Such devices are commercially available with capacities ranging from 1 to 4000 gallons per minute. Extraction takes place in this device, the copper values loading the organic phase and leaving a barren aqueous phase. As noted hereinabove, the extraction agent is an $\alpha$-hydroxy oxime in a suitable hydrocarbon carrier, typically kerosene. The organic: aqueous phase ratio should be in the range of from about 1:1 to about 3:1, and is preferably about 2:1. A higher alcohol such as isodecanol is useful as a conditioner to prevent interface losses.

Due to the increase in liquid volume during pH adjustment, there is likely to be more barren solution than is required for etch solution regeneration. In plants treating large volumes of liquid it will be worthwhile to recover this excess, as for example, in a fertilizer plant. In this instance, ammonia hydroxide would be the neutralizing agent. In smaller plants the excess may be safely discharged to waste, since it is free of copper salts and is very close to neutral. Alkali of alkaline earths would be the neutralizer in such an instance.

Regeneration of the etch solution is carried out by well known methods. Ammonium persulfate is recovered in an electrolytic cell, the sulfate being oxidized to persulfate at the anode. The fresh etch solution is then prepared.

The loaded organic phase is passed to the stripping section, which is another multi-stage, liquid-liquid solvent extraction unit. Here it is mixed with sulfuric acid or alternately with sulfuric acid and water in successive stages. Stripping can be controlled visually because as the stripping progresses the organic phase loses color and the acid phase takes on the characteristic $(Cu(OH)_4)SO_4$ color.

The copper-free organic phase is returned to the extraction unit and the copper-bearing acid phase is passed to a conventional copper recovery unit, which may be an electrolytic cell or a $CuSO_4$ crystallization device, depending on the form of the copper desired.

Organic phase losses are extremely small if adequate settling time is provided for phase separation. Losses are estimated to be about 0.05 to 0.10 gallon of mixed solvent per 1000 gallons of aqueous phase treated.

Understanding of the invention will be facilitated by the following specific examples thereof, which are intended to be illustrative only and should not be considered in a limiting sense:

EXAMPLES

Results of twelve extraction tests, at pH's varying from 0.15 to 10.5, are summarized in Table I. The extraction agent employed in all tests was LIX-63 (trademark) purchased from General Mills, Inc. The organic phase consisted of 5% LIX-63, 2.5% isodecanol and the balance (92.5%) kerosene. The isodecanol is used as a conditioner. In all tests the organic to aqueous phase ratio was 2.

Stripping was carried out with 3 N sulfuric acid at an organic to aqueous phase ratio varying from 0.5 to 0.2, results being judged visually. Stripping was considered complete when the organic phase was a straw yellow color. Four stage stripping was found adequate in all cases.

All tests were carried out at room temperatures.

copper values are extracted into said organic phase; separating the copper-bearing organic phase from the persulfate solution; and recovering the copper from said organic phase.

TABLE I

| pH | Color before extraction | Copper | | | | Color of aq. after extraction | Change in organic color |
|---|---|---|---|---|---|---|---|
| | | Start, g.p.l. | After extract, g.p.l. | Percent remain | Percent removed | | |
| 0.15 | Pale green blue | 4.16 | 4.16 | 100 | 0 | No change | No change. |
| 1.0 | do | 3.61 | 3.65 | 100 | 0 | do | Do. |
| 2.0 | do | 3.52 | 3.42 | 97.25 | 2.75 | do | Do. |
| 4.8 | Pale blue | 3.74 | 2.64 | 71 | 29 | Very pale green | Green to darker green. |
| 5.0 | Light blue | 3.58 | 1.55 | 43 | 57 | do | Green to blue. |
| 5.4 | Deeper blue | 3.45 | 0.50 | 14.5 | 85.5 | Nearly colorless | Deep blue. |
| 5.6 | Deep blue | 3.50 | 0.80 | 24.3 | 75.7 | Water white | Do. |
| 5.8 | do | 3.40 | 0.04 | 1.2 | 98.8 | do | Do. |
| 7.1 | Very deep blue | 4.06 | 0.28 | 7 | 93 | do | Do. |
| 8.0 | do | 3.41 | 2.14 | 62.8 | 37.2 | Very pale blue | Do. |
| 10.0 | do | 2.17 | 1.97 | 91 | 9 | Deep blue | No change. |
| 10.5 | do | 2.17 | 2.25 | 100+ | 0 | do | Green to yellow (back extraction). |

Other tests indicated that no adverse effects were encountered with as much as 10% of the oxime in the organic phase. At much below 5%, however, extraction dropped off considerably.

Various changes in the details, steps, materials and arrangements of parts, which have herein been described and illustrated in order to explain the nature of the invention, may be made by those skilled in the art within the principle and scope of the invention, as defined in the appended claims.

What is claimed is:

1. The process for extracting copper from copper-bearing ammonium persulfate solutions, which comprises:
   adjusting the pH of such a solution to a value within the range of from about 5.5 to about 7.5; and
   extracting copper from said solution by contacting the solution with an organic phase comprising a water insoluble liquid hydrocarbon and an α-hydroxy oxime.

2. The process for extracting copper values from copper-bearing ammonium persulfate solutions, which comprises:
   adjusting the pH of such a solution to a value within the range of from about 5.5 to about 7.5,
   contacting said solution with an organic phase comprising a water insoluble liquid hydrocarbon and an α-hydroxy oxime to extract copper from said solution and transfer it into said organic phase, and
   separating the resulting copper-bearing organic phase from the persulfate solution.

3. The process for recovering copper from copper-bearing ammonium persulfate solutions, which comprises:
   adjusting the pH of such a solution to a value within the range of from 5.5 to 7.5,
   contacting said solution with an organic phase comprising kerosene and an α-hydroxy oxime whereby copper is extracted from said solution by said organic phase,
   separating the copper-bearing organic phase from the persulfate solution, and
   recovering the copper from said organic phase.

4. The process for recovery of copper from copper-bearing ammonium persulfate solutions which comprises:
   adjusting the pH of said solution to a value within the range of from 5.5 to 7.5;
   contacting said solution with an organic phase comprising a water insoluble liquid hydrocarbon and an α-hydroxy oxime, whereby at least about 85% of said 5. The process as claimed in claim 4, wherein said α-hydroxy oxime has the general formula:

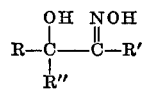

where R and R' are organic hydrocarbon radicals and R" is selected from the group consisting of hydrogen and organic hydrocarbon radicals.

6. The process as claimed in claim 4, wherein said pH is adjusted to a value within the range of from about 6.0 to about 7.0.

7. The process as claimed in claim 5, wherein said organic phase contains from about 5% to about 10% by weight of said α-hydroxy oxime.

8. The process as claimed in claim 4, wherein the organic to aqueous phase ratio is between about 1:1 and 3:1.

9. The process as claimed in claim 4, wherein said contacting step is carried out in a plurality of countercurrent contacting zones.

10. The process as claimed in claim 4, wherein said recovery is carried out by contacting said copper-bearing organic phase with an aqueous mineral acid solution in a plurality of countercurrent contacting zones, whereby said copper values are extracted into said acid solution, and recovering said copper values from said solution.

11. The process as claimed in claim 10, wherein said organic phase is recycled to said first contacting step after said copper values have been transferred into said acid solution.

12. A process for the regeneration of copper-bearing ammonium persulfate etch solutions comprising:
   adjusting the pH of said solution to a value within the range of from about 5.5 to about 7.5;
   contacting said solution with an organic phase comprising a water insoluble liquid hydrocarbon and an α-hydroxy oxime in a plurality of countercurrent contacting zones, whereby at least 85% of said copper values are extracted into said organic phase, said α-hydroxy oxime having the general formula:

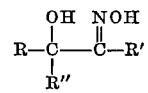

where R and R' are organic hydrocarbon radicals and R" is selected from the group consisting of hydrogen and organic hydrocarbon radicals;

separating the copper-bearing organic phase from the etch solution;

regenerating said etch solution by oxidizing ammonium sulfate contained therein to ammonium persulfate in an electrolytic cell and recovering said ammonium persulfate for re-use;

stripping the copper values from said organic phase by contacting said organic phase with an aqueous mineral acid solution in a plurality of countercurrent stripping zones, whereby said copper values are extracted into said acid solution;

recycling the organic phase to said first contacting step;

recovering the copper values from said aqueous mineral acid solution; and recycling said aqueous mineral acid solution to said stripping step.

13. The process as claimed in claim 12, wherein the liquid hydrocarbon is kerosene.

14. The process as claimed in claim 12, wherein said pH is adjusted to a value in the range of from about 6.0 to about 7.0.

15. The process as claimed in claim 13, wherein the organic to aqueous phase ratio is (1) between about 1:1 and about 3:1 in said contacting step, and (2) between about 0.2:1 and 0.5:1 in said stripping step.

References Cited

UNITED STATES PATENTS

| | | | |
|---|---|---|---|
| 3,224,873 | 12/1965 | Swanson | 75—117 |
| 3,276,863 | 10/1966 | Drobnick et al. | 75—117 |
| 3,294,842 | 12/1966 | Swanson | 75—117 |

L. DEWAYNE RUTLEDGE, *Primary Examiner.*

T. R. FRYE, *Assistant Examiner.*

U.S. Cl. X.R.

75—101, 97

PO-1050
(5/69)

UNITED STATES PATENT OFFICE
CERTIFICATE OF CORRECTION

Patent No. 3,440,036           Dated  May 22, 1969

Inventor(s)  Robert W. Spinney

It is certified that error appears in the above-identified patent and that said Letters Patent are hereby corrected as shown below:

Col. 3, line 61, that portion of the formula $(NH)_x)$ should read $(NH_3)_x)$.

SIGNED AND
SEALED
FEB 24 1970

(SEAL)
Attest:

Edward M. Fletcher, Jr.
Attesting Officer

WILLIAM E. SCHUYLER, JR.
Commissioner of Patents